US007942478B2

(12) United States Patent
Cymbalski et al.

(10) Patent No.: US 7,942,478 B2
(45) Date of Patent: May 17, 2011

(54) HUMAN FORM CHILD CAR SEAT

(75) Inventors: Brent Cymbalski, Chesterfield, MI (US); Mitchell Prine, West Palm Beach, FL (US)

(73) Assignee: Inspired Development Group, LLC, West Palm Beach, FL (US)

( * ) Notice: Subject to any disclaimer, the term of this patent is extended or adjusted under 35 U.S.C. 154(b) by 32 days.

(21) Appl. No.: 11/428,551

(22) Filed: Jul. 4, 2006

(65) Prior Publication Data
US 2008/0197679 A1    Aug. 21, 2008

Related U.S. Application Data

(60) Provisional application No. 60/697,320, filed on Jul. 7, 2005.

(51) Int. Cl.
*A47C 7/62* (2006.01)
*A47C 7/68* (2006.01)
*A47B 83/02* (2006.01)
*A47D 1/00* (2006.01)
*A47D 1/10* (2006.01)
*A47D 15/00* (2006.01)
*A62B 35/00* (2006.01)

(52) U.S. Cl. ............ 297/250.1; 297/148; 297/153; 297/181; 297/188.14; 297/484; D6/333; D6/351; D6/356; D6/358; D6/359

(58) Field of Classification Search ............ 297/250.1, 297/181, 188.14, 148, 153, 485, 484; D6/333, D6/345, 351, 356, 358, 359
See application file for complete search history.

(56) References Cited

U.S. PATENT DOCUMENTS

| | | | | | |
|---|---|---|---|---|---|
| D68,529 | S | * | 10/1925 | Graff | D6/345 |
| D71,940 | S | * | 2/1927 | Hansen | D6/358 X |
| D82,224 | S | * | 10/1930 | Maydell | D6/359 |
| D87,965 | S | * | 10/1932 | LeBeck | D6/359 |
| D157,066 | S | * | 1/1950 | Melzian | D6/359 X |
| D158,472 | S | * | 5/1950 | Kurtzman | D6/359 |
| 2,799,322 | A | * | 7/1957 | Jordan | 297/254 |
| D206,223 | S | * | 11/1966 | Haley | D6/359 X |
| 3,840,916 | A | * | 10/1974 | Jennings | 297/181 X |
| D265,440 | S | * | 7/1982 | Orenstein | D6/359 |
| D266,290 | S | * | 9/1982 | Orenstein | D6/359 |
| D276,361 | S | * | 11/1984 | Hyman, Sr. | D6/359 X |
| 4,586,747 | A | * | 5/1986 | Taylor | 297/256.11 |
| 4,695,092 | A | * | 9/1987 | Hittie | 297/219.12 |
| 4,883,749 | A | * | 11/1989 | Roberts et al. | 434/247 |
| 4,909,573 | A | * | 3/1990 | Barry et al. | 297/181 X |
| D314,870 | S | * | 2/1991 | Walsh | D6/358 |

(Continued)

*Primary Examiner* — Dunn David
*Assistant Examiner* — Rodney B White
(74) *Attorney, Agent, or Firm* — Steven B. Stein

(57) ABSTRACT

The present invention provides a human form child car seat comprising: (a) a seat body having (i) a generally human body head and arm shape, including a seat wall and a backrest wall; (ii) a front seat side; (iii) a back side; (iv) a top side; (v) bottom side; (vi) a left side; and (vii) a right side; (b) a top side concave-shaped head support, the head support capable of cradling a juvenile head comprising (i) a left side head support and (ii) a right side head support; (c) a left arm rest and a right arm rest, each having a generally human arm shape, the arm rest terminating in a cup holder having a generally human first shape, the cup holder capable of receivably accepting a geometrically shaped object; and a seat base. The present invention further provides a quick release seatbelt system.

19 Claims, 8 Drawing Sheets

U.S. PATENT DOCUMENTS

| | | | | |
|---|---|---|---|---|
| 5,082,325 A * | 1/1992 | Sedlack | ......................... | 297/468 |
| 5,106,156 A * | 4/1992 | Marquis | ......................... | 297/153 |
| 5,118,063 A * | 6/1992 | Young, Sr. | ................. | 248/311.2 |
| 5,137,335 A * | 8/1992 | Marten | ...................... | 297/181 X |
| D343,891 S * | 2/1994 | Kessler | ....................... | D23/297 |
| 5,354,118 A * | 10/1994 | Barry | ............................ | 297/181 |
| D356,449 S * | 3/1995 | Frye | ............................... | D6/359 |
| 5,507,551 A * | 4/1996 | Barry | ............................ | 297/181 |
| 5,560,680 A * | 10/1996 | Salvador et al. | ......... | 297/256.15 |
| 5,652,975 A * | 8/1997 | Hoskin | ............................ | 4/661 |
| 5,775,772 A * | 7/1998 | Lefranc | ...................... | 297/250.1 |
| D411,771 S * | 7/1999 | Ellingwood | ................... | D6/358 |
| 5,941,599 A * | 8/1999 | Roberts | ..................... | 297/181 X |
| D421,343 S * | 3/2000 | Bennardo | ..................... | D6/333 |
| D430,414 S * | 9/2000 | Aloisi | ........................... | D6/358 |
| 6,309,016 B1 * | 10/2001 | Aloisi | .......................... | 297/181 |
| D453,040 S * | 1/2002 | Davis | .......................... | D23/297 |
| 6,398,302 B1 * | 6/2002 | Freedman et al. | ......... | 297/250.1 |
| D460,278 S * | 7/2002 | Harshman | ..................... | D6/333 |
| 6,478,372 B1 * | 11/2002 | Lemmeyer et al. | ...... | 297/188.18 |
| 6,511,124 B2 * | 1/2003 | Combs | .......................... | 297/135 |
| 6,589,058 B2 * | 7/2003 | Brooks | .......................... | 434/365 |
| 6,592,180 B2 * | 7/2003 | Combs | ..................... | 297/188.14 |
| D481,449 S * | 10/2003 | Hervey | ........................ | D23/297 |
| 6,829,788 B1 * | 12/2004 | Allen | ................................ | 4/483 |
| 6,857,700 B2 * | 2/2005 | Eastman et al. | ........... | 297/250.1 |
| 7,243,991 B2 * | 7/2007 | Ojeda | ...................... | 297/188.14 |
| 7,360,830 B2 * | 4/2008 | Balensiefer et al. | ..... | 297/188.08 |
| 2001/0035671 A1 * | 11/2001 | Brooks | ..................... | 297/188.03 |
| 2002/0096916 A1 * | 7/2002 | Combs | ..................... | 297/188.14 |
| 2002/0101099 A1 * | 8/2002 | Hughes | ......................... | 297/181 |
| 2004/0108758 A1 * | 6/2004 | Eastman et al. | ........... | 297/250.1 |
| 2006/0138814 A1 * | 6/2006 | Burbrink | ..................... | 297/188.14 |
| 2007/0029848 A1 * | 2/2007 | Probst | ........................... | 297/148 |
| 2007/0176469 A1 * | 8/2007 | Day | ............................... | 297/153 |
| 2007/0261981 A1 * | 11/2007 | Ojeda | .................. | 297/188.14 X |
| 2009/0230737 A1 * | 9/2009 | Le et al. | ......................... | 297/181 |

* cited by examiner

HUMAN FORM CHILD CAR SEAT

The present application claims priority to Provisional Application, Ser. No. 60/697,320, filed on Jul. 7, 2005, which is hereby incorporated by reference in its entirety.

FIELD OF THE INVENTION

The above-identified invention involves the field of a child safety seats in general and specifically relates to a human form child car seat with quick release restraint system.

BACKGROUND OF THE INVENTION

Young children are generally restrained in an automobile, by government decree, in specially designed forward or rearward facing seats that are, in turn, secured to the regular vehicle seat using integral vehicle seat belts.

Child car seats are well known in the art and have been well described using a variety of methods and systems for effecting child restraint. Full integral seat belt restraint systems have been incorporated into some seats, while others act as "booster" seats, utilizing the seat belt restrain system that is part of the vehicle, simply lifting the child into a suitable position.

Two pervasive difficulties remain in effectively using a child car seat. First involves non-cooperative children who squirm and move, preventing effective tightening of the seat belt restraint system. Second is effective and rapid removal of a child from the seat in the event of an accident or other emergency.

Safety restrain belt systems are widely used and are well described in the art. However, the prior art fails to provide an effective, easy and rapid means for removal of a child from the seat in the event of accident or other emergency. The means of the prior art is often complicated, awkward and time consuming, requiring more than one single operation in the process of release.

Security is also a significant requirement, and the quick release system cannot be vulnerable to accidental release or easy manipulation by the child in the seat. According to the present invention, the quick release system lever is positioned on the back surface of the seat, easily accessible to an adult for rapid extraction of the child, but unavailable to a child's probing hands and insatiable curiosity. Moreover, a vertical/horizontal channel locking system and the requirement for lateral rod removal precludes accidental release.

The present invention provides an appealing and comfortable setting for the child, thereby solving the first problem. The present invention further provides an rapid seat belt restrain release system, thereby solving the second problem.

The present invention provides distinct advantages over the prior art and solves numerous problems described and understood in the field.

SUMMARY OF THE INVENTION

It is therefore an object of the present invention to provide a human form child car seat adapted to have a child seated therein, the child car seat comprising: (a) a seat body having (i) a generally human body head and arm shape, including a seat wall and a backrest wall; (ii) a front seat side; (iii) a back side; (iv) a top side; (v) bottom side; (vi) a left side; and (vii) a right side; (b) a top side concave-shaped head support, the head support capable of cradling a juvenile head comprising (i) a left side head support and (ii) a right side head support; (c) a left arm rest having a generally human arm shape, the arm rest terminating in a cup holder having a generally human fist shape, the cup holder capable of receivably accepting a geometrically shaped object; (d) a right arm rest having a generally human arm shape, the arm rest terminating in a cup holder having a generally human fist shape the cup holder capable of receivably accepting a geometrically shaped object; and (e) a seat base.

Moreover, it is a further object of the present invention to provide the a human form child car seat further comprising a quick release seatbelt system, capable of rapidly disengaging the seatbelts, enabling rapid release of a child from the seat.

DETAILED DESCRIPTION OF THE INVENTION

Figure 1:
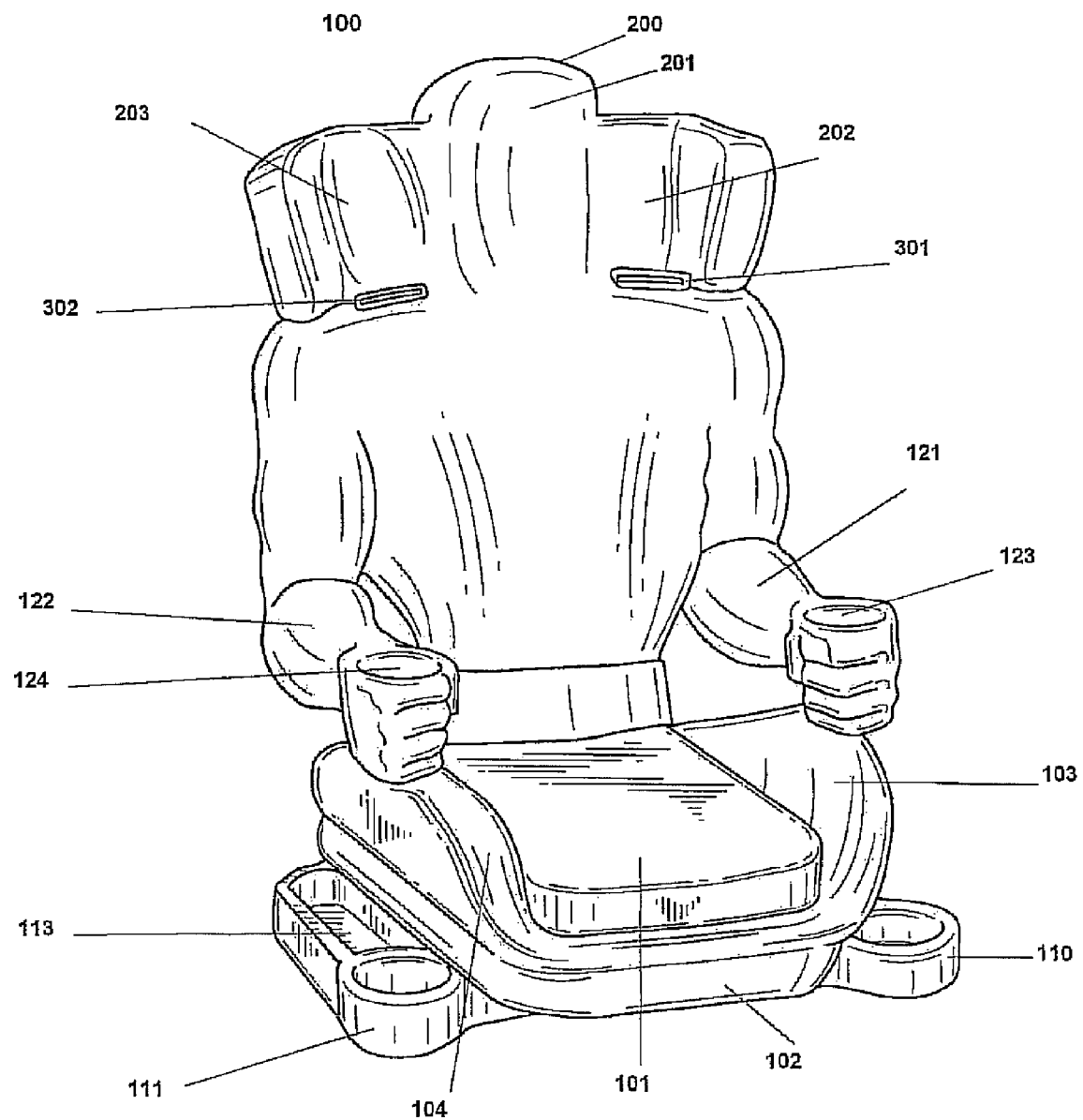
FIG. 1 shows a perspective view of the car seat in accordance with the present invention.
Figure 2:
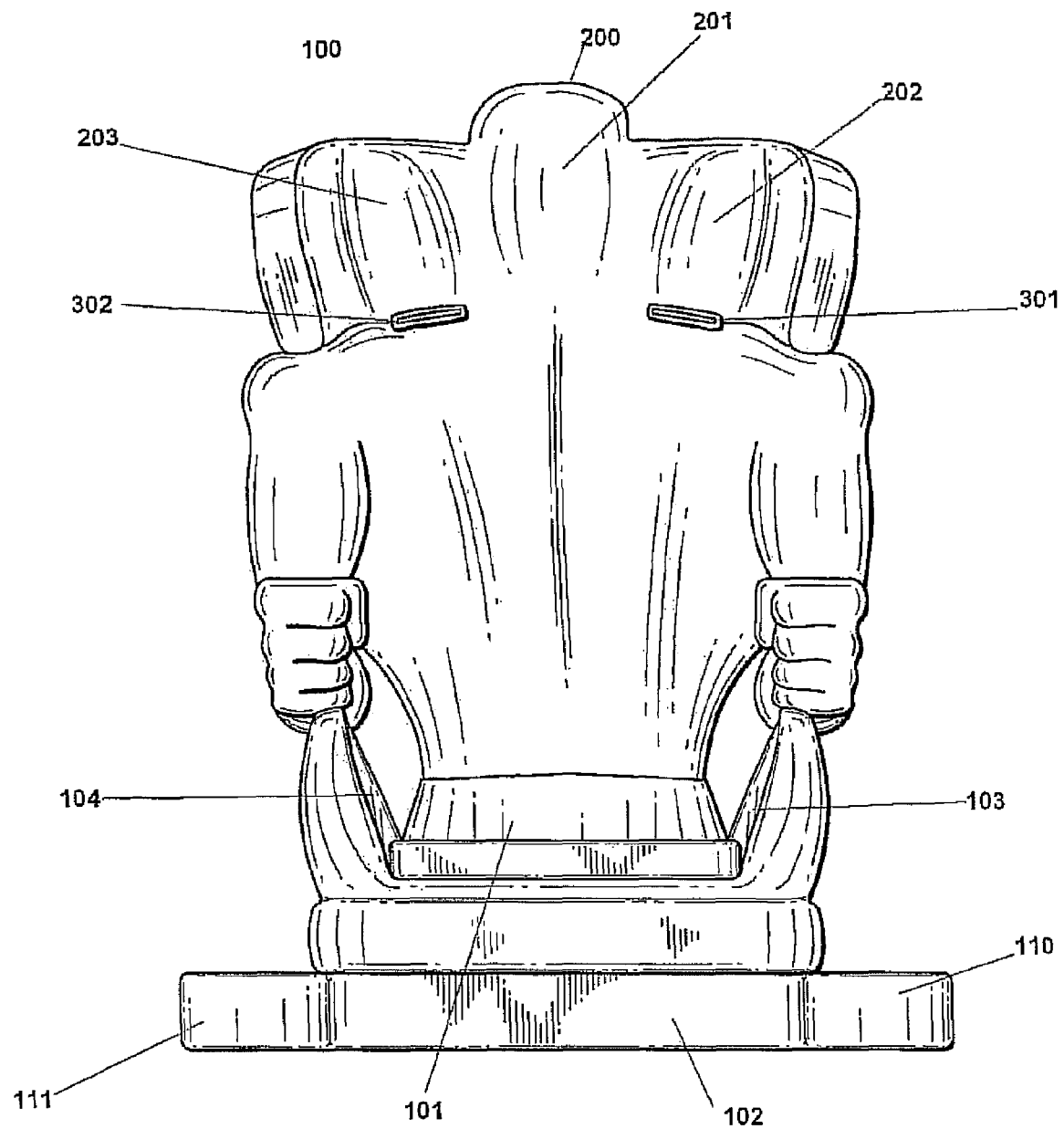
FIG. 2 shows a front view of the seat in accordance with the present invention.
Figure 3:
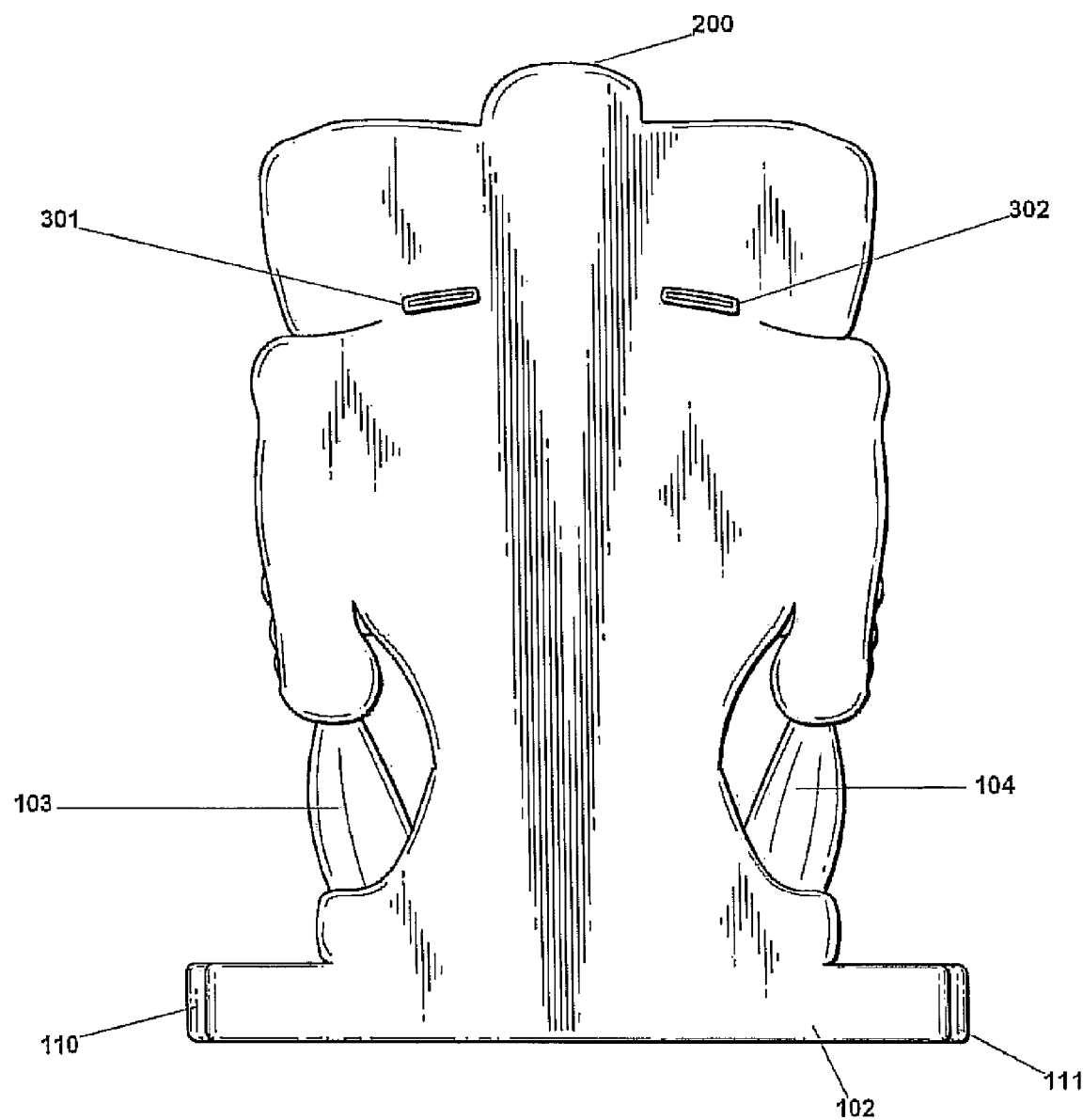
FIG. 3 shows a rear view of the device in accordance with the present invention.
Figure 4:
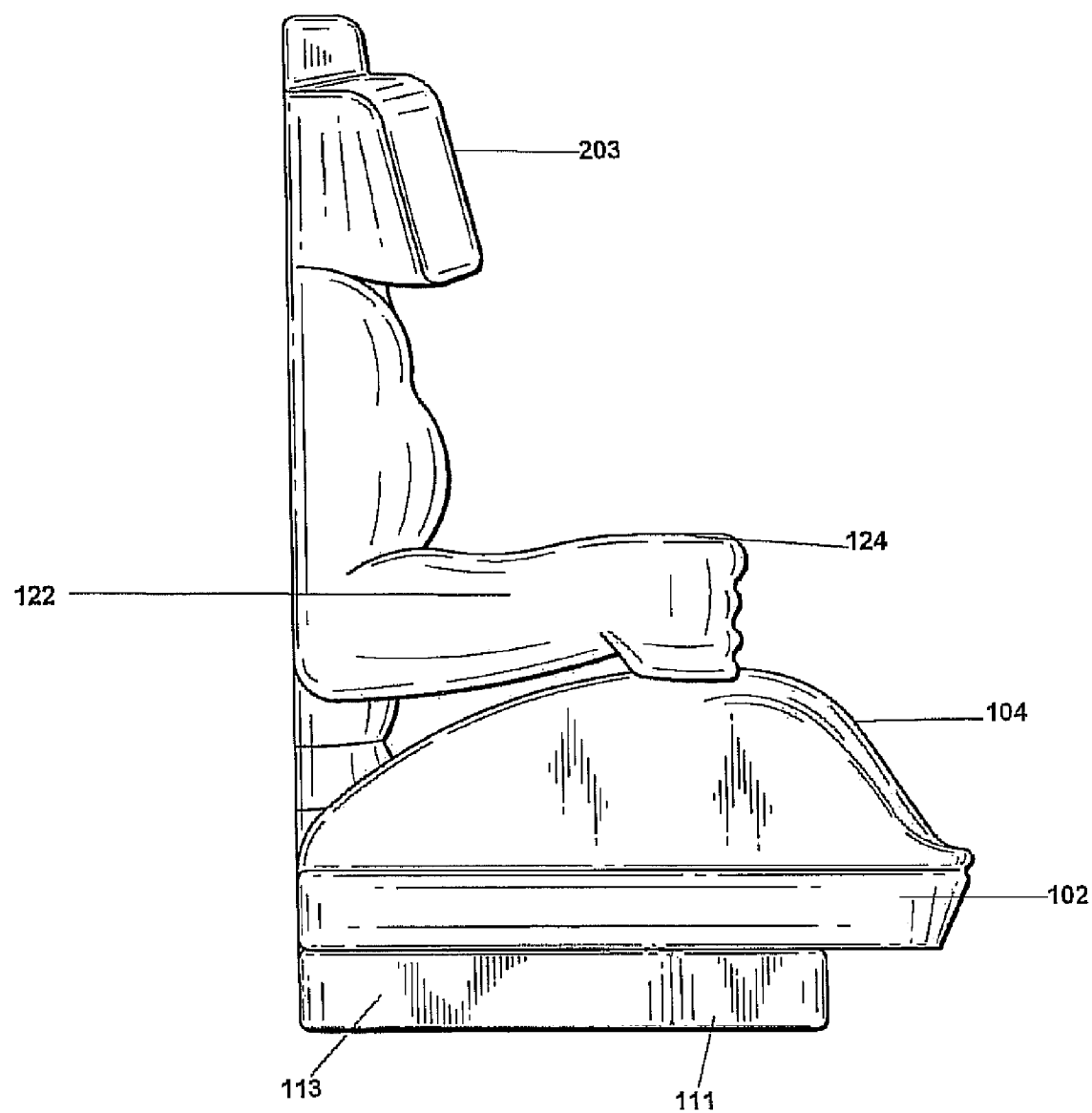
FIG. 4 shows a side view of the device in accordance with the present invention.

The present invention provides a human form child car seat adapted to have a child seated therein, the child car seat comprising: (a) a seat body having (i) a generally human body head and arm shape, including a seat wall and a backrest wall; (ii) a front seat side; (iii) a back side; (iv) a top side; (v) bottom side; (vi) a left side; and (vii) a right side; (b) a top side concave-shaped head support, the head support capable of cradling a juvenile head comprising (i) a left side head support and (ii) a right side head support; (c) a left arm rest having a generally human arm shape, the arm rest terminating in a cup holder having a generally human fist shape, the cup holder capable of receivably accepting a geometrically shaped object; (d) a right arm rest having a generally human arm shape, the arm rest terminating in a cup holder having a generally human fist shape the cup holder capable of receivably accepting a geometrically shaped object; and (e) a seat base.

According to one embodiment of the present invention the arms are removable. According to another embodiment, at least one arm is adjustable in the vertical plane. According to still anther embodiment, at least one arm is adjustable in the horizontal plane. According to a further embodiment, at least one head support is adjustable in the vertical plane. According to a yet a further embodiment, at least one head support is adjustable in the horizontal plane.

According to an embodiment of the present invention, the seat base further comprises a storage compartment. It is expressly contemplated by the present invention that the storage compartment may be open or enclosed. The storage compartment may be modular, enabling removal of the compartment and replacement therefore with a variety of insertable components. Stored items may be contained by a variety of means such as drawers, nettings, cords, elastic or wrappers. The storage compartment may integrate smaller compartments within the storage area. The storage compartment may include a closeable cover. According to another embodiment of this invention, the seat base further comprises at least one cup holder. The cup holder is positioned so that a child seated in the seat can reach an item placed in the cup holder.

According to another embodiment of the present invention, the seat further comprises a fastenable seat restraint belt system. A variety of seat restrain belt systems have been described in the art and are suitable for use with the present invention. According to a preferred embodiment of this invention, the seat restraint belt system is a three-point belt. According to a more preferred embodiment of this invention, the seat restraint belt system is a five-point harness type belt.

According to still another embodiment of the present invention, the seat body shape generally comprises the form of a cartoon character. Numerous cartoon characters are well known from comics, television and movies. Lists of cartoon characters are omnipresent in the literature such as, http://en.wikipedia.org/wiki/list_of_disney_characters, http://en.wikipedia.org/wiki/list_of_comic_and_cartoon_character_pairs, http://animatedtv.about.com/library/extra/bltop50.htm, and http://encyclopedia.laborlawtalk.com/List_of_comic_and_cartoon_characters. which are incorporated hereto by reference. Other cultural icons, toys, dolls and action figures such as Barbie®, Teenage Mutant Ninja Turtles® and Power Rangers® are also specifically contemplated. According to a preferred embodiment of this invention, the character is selected from the list that includes Batman®, and Spiderman®. The present invention specifically contemplates the use of any cartoon character as the form for the seat.

According to an alternative embodiment of the present invention, the generally human body shape is a representation of an actual person. The actual person may be a public figure, such as a politician, sports figure, actor, cultural figure, religious figure, historical figure or scientist. Alternatively, the actual person may be a private individual, such as the child typically using the seat, or another family member. According to yet another alternative embodiment, the individual is a generic person such as a child, mother or father. According to yet still another alternative embodiment, the individual is an animal. According to a preferred embodiment of this invention, the character is selected from the list that includes Jeff Gordon and Dale Earnhardt, Jr.

According to another embodiment of the present invention, the seat is further comprising an insertable accessory device. According to one embodiment of this invention, the insertable accessory device is mounted to the seat by removably inserting an geometrically shaped attachment object extending forth from the insertable accessory device into at least one of the arm rest cup holders.

According to a preferred embodiment of this invention, the geometrical shape is a cylinder. According to another preferred embodiment of this invention, the insertable accessory device is a tray table. The present invention specifically contemplates a wide variety of insertable accessory devices, including toys, games reading lights and the like. It is also understood that in some cases both arm cup holders would be needed to support the insertable accessory device. However, in other cases a single cup holder would be needed, leaving the second cup holder available to support a second insertable accessory device or to be simply used as a cup holder.

According to another embodiment of the present invention, the seat is further comprising a quick release seatbelt system, capable of rapidly disengaging the seatbelts, enabling rapid release of a child from the seat. According to one embodiment of this invention, the quick release system comprises: (a) A quick release rod, the rod having a handle end portion, a straight middle length and a far end portion, the handle end portion bent at an angle approximately perpendicular to the straight middle length; and (b) At least one locking rib, the locking rib comprising a block body having groove there through, approximately parallel with the top of the seat, perpendicular with the arms, and capable of insertably receiving the quick release rod horizontally through the groove, wherein the groove comprises a horizontal portion and a vertical portion arranged so that the rod can be locked into place in the horizontal plane, thereby preventing movement of the rod in the vertical plane. According to a preferred embodiment of this invention, a five-point harness is used. According to this preferred embodiment, each of the five harness straps include a rear extending and looped end through which is slidably engaged a release lever, which is in turn supported upon a plurality of locking ribs extending from the back side of the seat. Upon rotating and laterally translating and withdrawing the rod, each of the five harnesses are quickly released from engagement against the rear facing side of the seat thereby permitting the child to be quickly removed. According to a preferred embodiment of this invention, the rod is cylindrical. It is specifically contemplated by the present invention that the rod may be made from a variety of materials including wood, plastic, metal, fiberglass or composite. According to a preferred embodiment, the rod is metal. The rod is of sufficient tensile strength so that it is capable of supporting the seat belt under tension. According to another preferred embodiment of the invention, there are five locking ribs. According to one embodiment of this invention, the locking rib is integral with the seat. According to another embodiment of this invention, the locking rib is removably attached to the back of the seat by a fastening means. A fastening means includes but is not limited to a screw, bolt, rivet, and glue.

Figure 5:
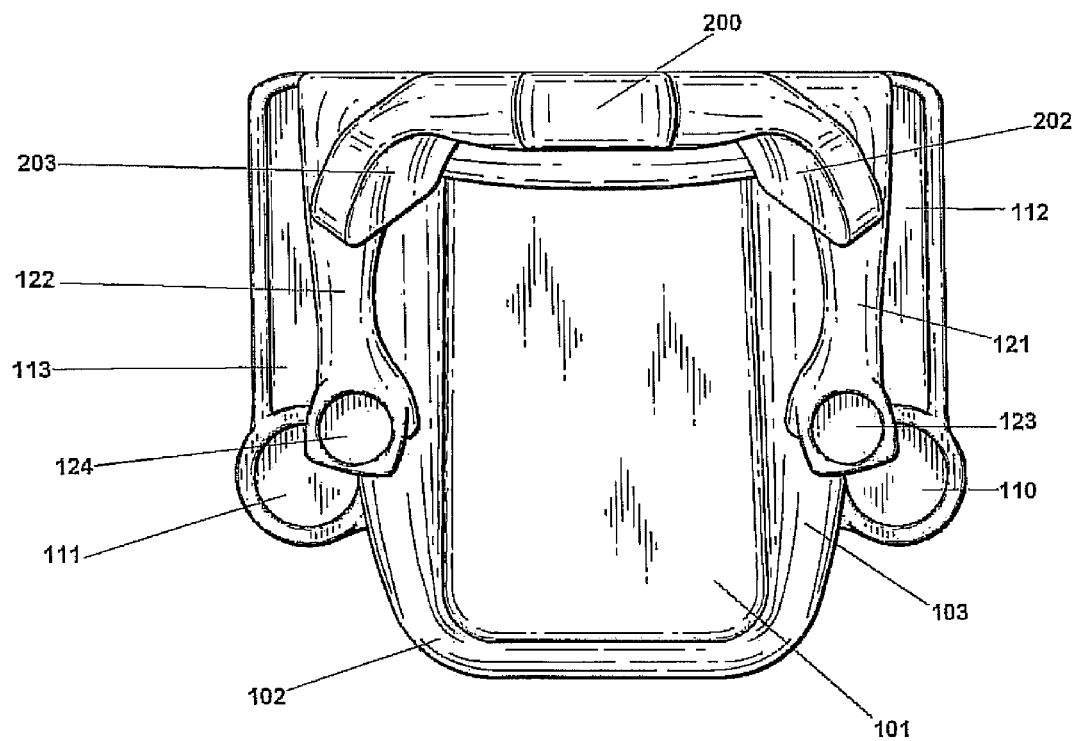
FIG. 5 shows a top view of the device in accordance with the present invention.
Figure 6:
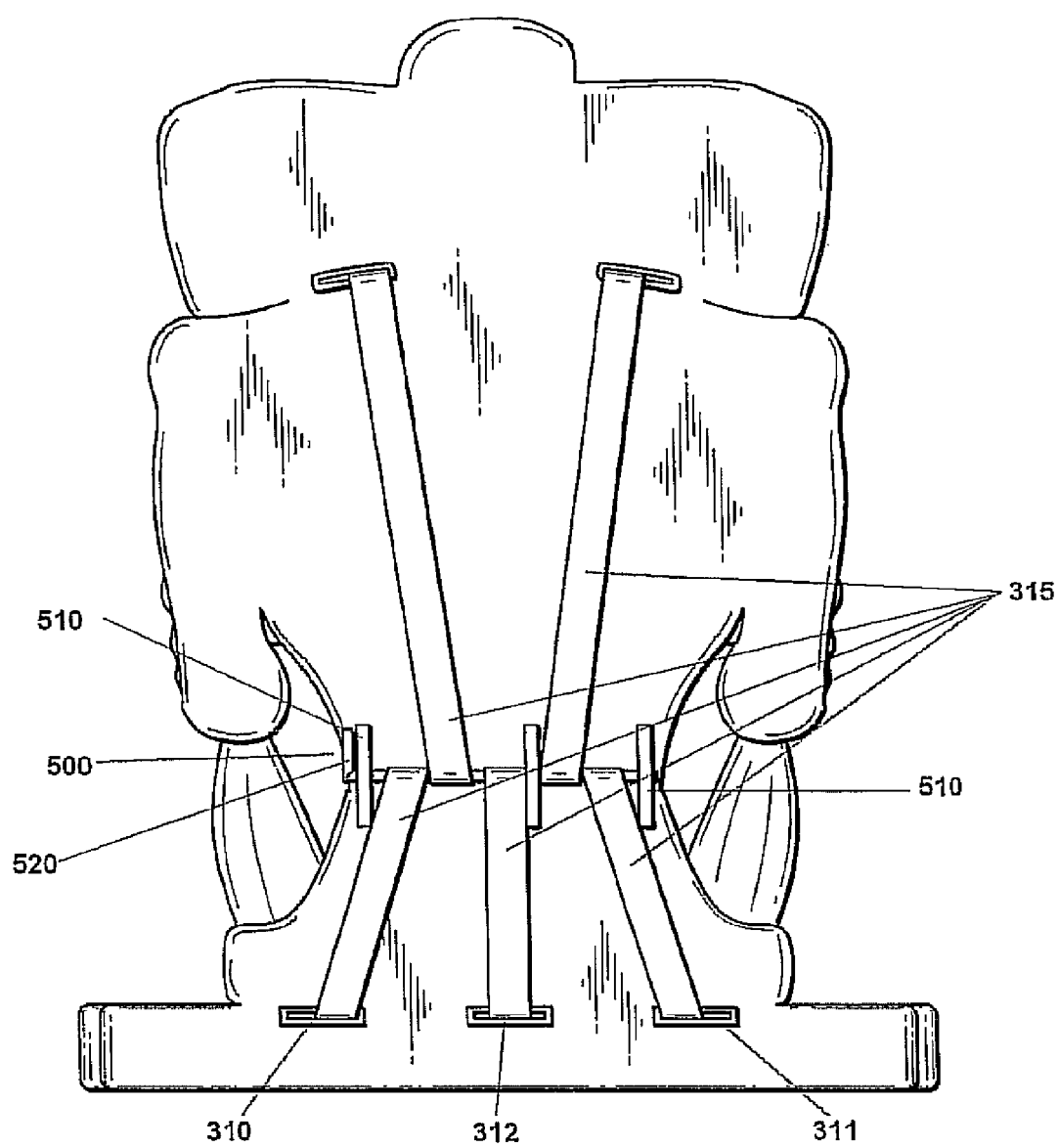
FIG. 6 shows a rear view of the device showing a five-point seat belt quick release system in accordance with the present invention.
Figures 7, 8:
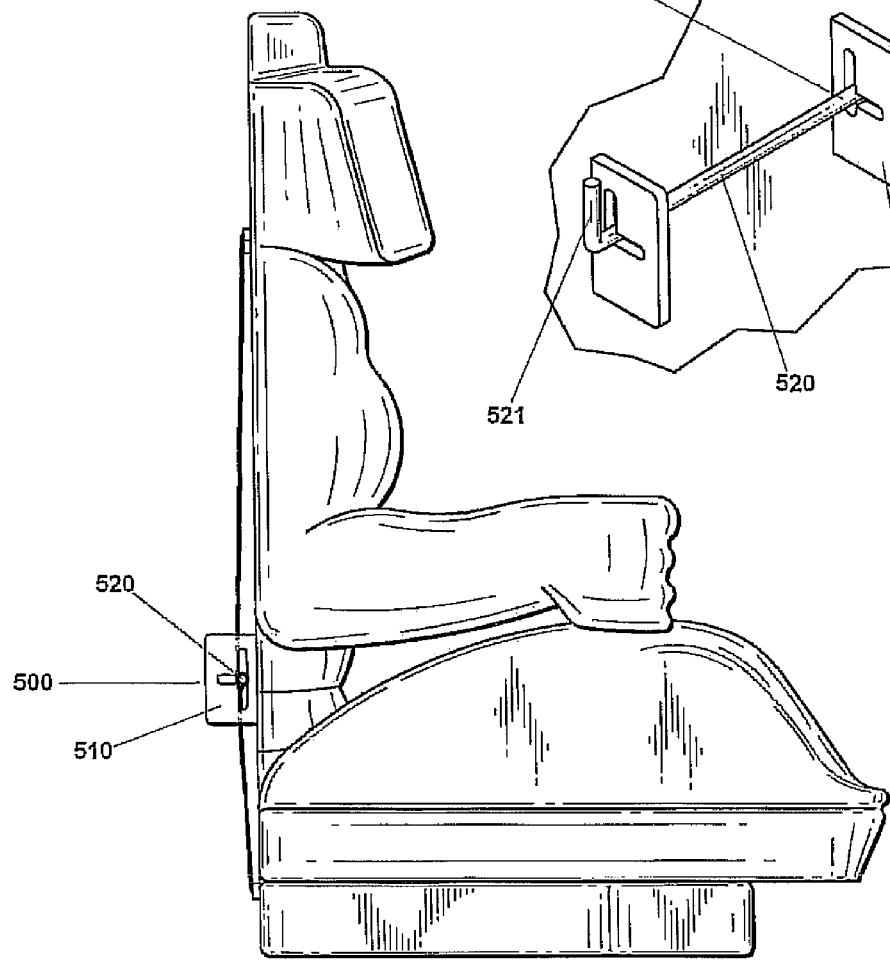
FIG. 7 shows a side view of the seat showing the quick release system in accordance with the present invention.
FIG. 8 shows a perspective view of the quick release system in a preferred embodiment in accordance with the present invention.
Figure 9:
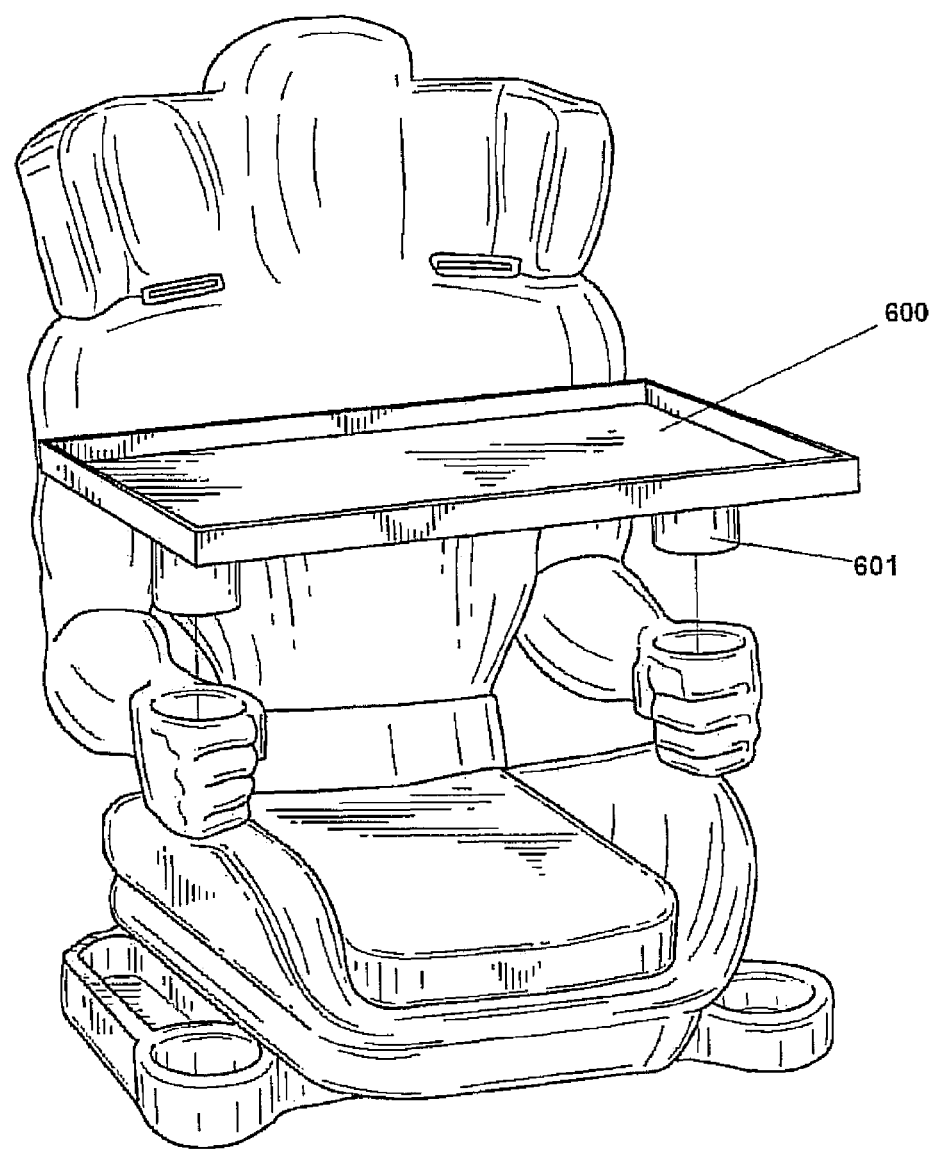
FIG. 9 shows a perspective view of the child car safety seat with an insertable accessory device in a preferred embodiment.

According to still yet another embodiment of the present invention, the seat further comprises a left shoulder belt aperture and a right shoulder belt aperture. The shoulder belt aperture is capable of receiving and having pass there through a seat belt. According to a preferred embodiment of the present invention, the seat belt is part of a five-point belt system. According to still yet another embodiment of the present invention, the seat further comprises a left lap belt aperture and a right lap belt aperture. The lap belt aperture is capable of receiving and having pass there through a seat belt. According to a preferred embodiment of the present invention, the seat belt is part of a five-point belt system. In addition, there is a crotch belt aperture positioned in the seat. The crotch belt aperture is capable of receiving and having pass there through a seat belt. According to a preferred embodiment of the present invention, the seat belt is part of a five-point belt system. Turning now to the figures. FIG. 1 shows a perspective view of the child car safety seat 100. The seat cushion 101 rests on the seat base 102, which has an integral left side leg rest 103 and a right side leg rest 104. Integral with the seat base are a plurality of cup holders and storage compartments. As shown the invention provides a left seat base cup holder 110 and a right seat base cup holder 111 and a right seat base storage compartment 113. A left seat base storage compartment 112 is shown in FIG. 5. The invention also provides a left arm armrest 121 and a right arm armrest 122. The figure shows a left arm cup holder 123 and a right arm cup holder 124. As described herein, according to alternative embodiments of the present invention, the arm rests 121 and 122 are movable in the vertical and horizontal plane. Such movement is achieved by sliding means, interlocking means and pivot means as described in the prior art with respect to movable armrests. The figure shows the head 200, which forms a depression 201 relative to the body of the seat, wherein the depression serves to cradle a child's head as the child leans back into the seat while in the seated position. Lateral to the head depression 201 is a left side head rest 202 and a right side head rest 203. As described herein, according to alternative embodiments of the present invention, the head rests 203 and 202 are movable in the horizontal plane. Such movement is achieved by sliding means, interlocking means and pivot means as described in the prior art. The figure further shows a left shoulder belt aperture 301 and a right shoulder belt aperture 302, each capable of receiving and having pass there through a seat belt. Each aperture transmits a channel completely through the seat from the front side to the back side, enabling transmission of the seat belt there through as shown in FIG. 6. FIG. 6 further shows the left lap belt aperture 310 and the right lap belt aperture 311 as well as the crotch lap belt aperture 312. Also shown is the 5-point seat belt system 315 as described in a preferred embodiment. FIG. 6 further shows the quick release system 500 comprised of a plurality of locking ribs 510, a quick release rod 520. FIG. 7 shows a side view of the quick release system 500 an FIG. 8 shows a detail view of the quick release system. As shown in detail, the quick release system comprises a quick release rod 520, the quick release rod having a handle end portion 521 bent at an angle approximately perpendicular to a straight middle length 522 and a far end portion 523. The quick release rod is shown passing through a plurality of locking ribs 510, each locking rib comprising a block body 511, the block body having a T-shaped groove there through with a first groove length of the T-shape 540 in the vertical direction and a second groove length of the T-shape 530 in the horizontal direction. FIG. 9 shows a perspective view of the child car safety seat with an insertable accessory device in a preferred embodiment. As shown, the insertable accessory device is a tray table 600, which is mounted to the child car safety seat by removably inserting an cylindrical shaped attachment object in the form of a leg 601 extending forth from the bottom of the table into each of the arm rest cup holders. It is contemplated that the legs 601 as shown have a locking mechanism as well known in the art, to prevent the tray table from being dislodged unintentionally.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

We claim:

1. A child car seat adapted to have a child seated therein, the child car seat comprising:
   a. a seat body having (i) a seat wall and a backrest wall; (ii) a front seat side; (iii) a back side; (iv) a top side; (v) bottom side; (vi) a left side; and (vii) a right side; wherein a juvenile sitting in the seat body is embraced by the front seat side, the bottom side, the left side and the right side;
   b. a top side head support;
   c. a seat base;
   d. a fastenable seat restraint belt system;
   e. a quick release seatbelt system, capable of disengaging all seatbelts, enabling rapid release of a child from the seat, wherein the quick release system comprises:
      i. a quick release rod, capable of horizontally inserting through the seat belt restraint system, facilitating contiguity of the seat belt restraint system, so that when the rod is horizontally removed, the seat belt restraint system is not contiguous, the rod having a handle end portion, a straight middle length and a far end portion, the handle end portion bent at an angle approximately perpendicular to the straight middle length; and
      ii. at least one locking rib situated on the back side of the seat body, the locking rib comprising a block body having a groove there through, capable of insertably receiving the quick release rod horizontally through the groove, wherein the groove comprises a horizontal portion and a vertical portion arranged so that the rod can be aligned in the horizontal portion of the groove in the horizontal plane, thereby preventing movement of the rod in the vertical plane.

2. The seat according to claim 1, wherein the seat base further comprises a storage compartment.

3. The seat according to claim 1, wherein the seat base further comprises at least one cup holder.

4. The seat according to claim 1, wherein the seat restraint belt system is a 5-point seat belt harness.

5. The seat according to claim 1, wherein the generally human body shape is a cartoon character.

6. The seat according to claim 5, wherein the character is a comic book character.

7. The seat according to claim 1, wherein the generally human body shape is a representation of an actual individual person.

8. The seat according to claim 1, wherein the rod is cylindrical.

9. The seat according to claim 8, wherein the locking rib block body is situated on the backside of the seat body in an orientation wherein the vertical portion of the groove and the horizontal portion of the groove form a "T" shape.

10. The seat according to claim 1, wherein the rod is of sufficient tensile strength so that it is capable of supporting the seat belt.

11. The seat according to claim 1, further comprising a left shoulder belt aperture and a right shoulder belt aperture.

12. The seat according to claim 1, further comprising a left lap belt aperture and a right shoulder belt aperture.

13. The seat according to claim 1, wherein the seat body further comprises a generally recognizable human body, head and arm shape.

14. The seat according to claim 1, wherein the seat body further comprises a generally recognizable animal body, head and arm shape.

15. The seat according to claim 1 wherein the seat is a human form child car seat, wherein
   a. the seat body is further comprising a generally recognizable human body, head and arm shape;
   b. the top side head support is further comprising a concave-shaped head support, the head support having a generally recognizable human head shape, and wherein the head support, capable of cradling a juvenile head, is comprising (i) a left side head support and (ii) a right side head support; and
   c. at least one arm rest having a generally recognizable human arm shape, the arm rest terminating in a cup holder having a generally recognizable human first shape, the cup holder capable of receivably accepting a geometrically shaped object.

16. The seat according to claim 15, further comprising an insertable accessory device, wherein the insertable accessory device is mounted to the seat by removably inserting a geometrically shaped attachment object extending forth from the insertable accessory device into at least one of the arm rest cup holders.

17. The seat according to claim 16, wherein the insertable accessory device is a tray table.

18. The seat according to claim 15, wherein the geometrical shape is a cylinder.

19. The seat according to claim 15, wherein at least one head support is adjustable in the vertical plane.

* * * * *